US008305027B2

(12) United States Patent
Shibuya

(10) Patent No.: US 8,305,027 B2
(45) Date of Patent: Nov. 6, 2012

(54) ELECTRIC COMPRESSOR CONTROL DEVICE

(75) Inventor: Makoto Shibuya, Kiryu (JP)

(73) Assignee: Sanden Corporation, Isesaki-shi, Gunma (JP)

(*) Notice: Subject to any disclaimer, the term of this patent is extended or adjusted under 35 U.S.C. 154(b) by 375 days.

(21) Appl. No.: 12/664,624

(22) PCT Filed: May 27, 2008

(86) PCT No.: PCT/JP2008/059704
§ 371 (c)(1),
(2), (4) Date: Dec. 14, 2009

(87) PCT Pub. No.: WO2008/152906
PCT Pub. Date: Dec. 18, 2008

(65) Prior Publication Data
US 2010/0188038 A1    Jul. 29, 2010

(30) Foreign Application Priority Data

Jun. 14, 2007 (JP) ................................ 2007-157327

(51) Int. Cl.
*H02P 27/06* (2006.01)
(52) U.S. Cl. ......... 318/780; 318/801; 318/479; 318/504
(58) Field of Classification Search .......... 318/778–780, 318/798–803, 478, 479, 504
See application file for complete search history.

(56) References Cited

U.S. PATENT DOCUMENTS

| 4,575,668 | A * | 3/1986 | Baker | 318/811 |
| 5,963,442 | A * | 10/1999 | Yoshida et al. | 363/98 |
| 7,012,401 | B2 * | 3/2006 | Ohkouchi et al. | 318/801 |
| 7,408,794 | B2 * | 8/2008 | Su | 363/98 |
| 2002/0121902 | A1 * | 9/2002 | Suzuki | 324/509 |
| 2004/0222767 | A1 | 11/2004 | Ohkouchi et al. | |

FOREIGN PATENT DOCUMENTS

| JP | H07-280326 A | 10/1995 |
| JP | 2000-217367 A | 8/2000 |
| JP | 2000-341974 A | 12/2000 |
| JP | 2004-336907 A | 11/2004 |
| JP | 2008-043189 A | 2/2008 |
| WO | 2004/107551 A1 | 12/2004 |

OTHER PUBLICATIONS

Japan Patent Office, International Search Report for International Patent Application No. PCT/JP2008/059704 (counterpart to above-captioned patent application), mailed Aug. 12, 2008.

* cited by examiner

*Primary Examiner* — Bentsu Ro
(74) *Attorney, Agent, or Firm* — Baker Botts L.L.P.

(57) ABSTRACT

An electric compressor control device includes: an inverter for electric compressor motor; a communication microcontroller arranged in a low-voltage region for transmission of an instruction signal via a high-speed communication bus; and a control microcontroller arranged in a high-voltage region and connected to the communication microcontroller via an insulation element for transmitting the instruction signal from the communication microcomputer as an inverter control signal to the inverter. The power voltage of the communication microcomputer is supplied from a low-voltage power source. The voltage from the low-voltage power source is transformed via a transformer and supplied as a power voltage of the control microcontroller. Thus, it is possible to use the existing insulation element at an insulation boundary between the low-voltage region and the high-voltage region so as to surely supply a predetermined power voltage to the microcontroller for controlling the inverter, thereby improving the communication reliability of the entire control device.

4 Claims, 2 Drawing Sheets

ELECTRIC COMPRESSOR CONTROL DEVICE

CROSS-REFERENCE TO RELATED APPLICATIONS

This application is the National Stage of International Patent Application No. PCT/JP2008/059704, filed May 27, 2008, which claims the benefit of Japanese Patent Application No. 2007-157327, filed Jun. 14, 2007, the disclosures of which are incorporated herein by reference in their entirety.

TECHNICAL FIELD OF THE INVENTION

The present invention relates to an electric compressor control device, and specifically, relates to an electric compressor control device which is suitable as an inverter control device for an electric compressor used in an air conditioning system for vehicles.

BACKGROUND ART OF THE INVENTION

Such a technology for a drive control of a motor of an electric compressor used in an air conditioning system for vehicles, for example, is known that a direct current supplied from a DC power source, such as high-voltage power source, is transformed by an inverter having multiple switching elements and a gate driving circuit into a pseudo alternating electric current, such as a 3-phase AC current, and that pseudo alternating electric current is applied to a motor for controlling the motor. For controlling that inverter, a control microcontroller is used, for example, and an instruction signal from the upper control unit is sent to the control microcontroller.

Such a system is constructed as shown in FIG. 2, for example. The direct current supplied from high-voltage power source 101 is transformed into a pseudo alternating current by inverter 104 having plural switching elements 102 and gate driving circuit 103, and the alternating current is supplied to motor 105 so as to drive electric compressor 106. An instruction signal sent from the upper control unit (not shown) via communication bus 107 is transmitted via a insulation element such as photo-coupler 108 to control microcontroller 109, so that an instruction signal from control microcontroller 109 controls gate driving circuit 103 of each switching element 102 and alternating current voltage supplied to motor 105. Usually, the area from communication bus 107 to photo-coupler 108 is located in a low-voltage region 110 (for example, 12V region), and the area at the side of control microcontroller 109, inverter 104 and motor 105 from photo-coupler 108 is located in a high-voltage region (for example, 200V region) for the requirement to drive the motor by high voltage. A boundary of both voltage regions 110, 111 are formed as insulation boundary 112, and photo-coupler 108 is located in a part of insulation boundary 112.

Recently, communication protocols such as CAN (Controller Area Network) whose communication speeds are high, are being employed. When those high-speed communication buses are employed, high-speed communication bus 107 and control microcontroller 109 are directly connected by photo-coupler 108 in an conventional construction as shown in FIG. 2, however, because the present photo-couplers are not suitable for high-speed communication, there is a problem that the response lag of photo-coupler 108 is generated to cause the communication lag, so that it is difficult to ensure the communication reliability.

For that problem, Patent document 1 discloses a technology, where the signal from a high-speed communication bus is received once by a communication microcontroller, the signal from the communication microcontroller is transmitted at a relatively low communication speed via a normal photo-coupler to a control microcontroller, and an inverter is controlled by the control microcontroller. Also in this case, the photo-coupler is located in an insulation boundary part between a low-voltage region and a high-voltage region.

However, in the construction disclosed in Patent document 1, because the power source voltage for the control microcontroller is designed to be supplied from a high-voltage power source (Namely, power source 101 in FIG. 2), if the high-voltage power source is unconnected the low-speed communication from the communication microcontroller to the control microcontroller cannot be performed and a trouble may be caused. In addition, because the power source voltage for the control microcontroller is taken out of the high-voltage power source at the inverter side, the length of wiring in an actual circuit construction becomes long and the circuit size becomes larger, and a voltage check circuit, etc., to stabilize the supply voltage is required separately because there is no guarantee that a predetermined voltage can be stably supplied to the control microcontroller. Therefore, there is a fear that the movement of the control microcontroller is not sufficiently stable and that the communication of the signal is not sufficiently reliable, consequently.

Patent document 1: JP-A-2004-336907

DISCLOSURE OF THE INVENTION

Problems to be Solved by the Invention

Accordingly, paying attention to the above-described problems of conventional technologies, an object of the present invention is to provide an electric compressor control device, in which existing insulation elements such as a photo-coupler can be used in an insulation boundary part between a low-voltage region and a high-voltage region, and a predetermined power source voltage can be surely supplied to a inverter control microcontroller so that the signal communication reliability is improved.

Means for Solving the Problems

To solve the above-described problems, an electric compressor control device according to the present invention is a control device comprising:

an inverter which transforms a direct current supplied from a high-voltage power source into a pseudo alternative current to be supplied as a drive current for an electric compressor motor;

a communication microcontroller which is arranged in a low-voltage region and to which an instruction signal is transmitted via a high-speed communication bus; and a control microcontroller which is arranged in a high-voltage region and connected to the communication microcontroller via an insulation element for transmitting the instruction signal from the communication microcontroller as an inverter control signal to the inverter, wherein a power voltage for the communication microcontroller is supplied from a low-voltage power source, and a voltage from the low-voltage power source is transformed via a transformer and supplied as a power voltage for the control microcontroller.

In this electric compressor control device, because the signal from the communication bus is received by the communication microcontroller a high-speed communication can be performed, and the transmission of the signal from the communication microcontroller to the control microcontroller is performed via an existing insulation element which is located in the insulation boundary part between the low-voltage region and the high-voltage region so that the low-speed communication can be surely performed so as to ensure a communication reliability therebetween. Further, because the power source voltage of the communication microcontroller is supplied from the low-voltage power source, a predetermined power source voltage can be stably supplied. The low-voltage power source voltage transformed via the transformer is supplied as the power source voltage for the control microcontroller, and the transformer can make up the insulation boundary between the low-voltage region and the high-voltage region, so that a predetermined power source voltage can be stably supplied surely into the control microcontroller. As a result, both of the communication microcontroller and the control microcontroller can be ensured to operate stably so that the communication reliability of the signal can be improved. Namely, the communication reliability can be improved while using an insulation element which exists in the present situation.

In the above-described electric compressor control device, it is preferable that the low-voltage power source voltage is transformed via the transformer and supplied also as a voltage for the gate driving in the inverter, as shown in an embodiment to describe later. That makes it possible to stably supply a predetermined voltage surely as a voltage for the gate drive in the inverter, too.

Further, though a photo-coupler is typically used as the above-described insulation element it is possible to use an element other than the photo-coupler. In other words, that element is sufficient if it can form the insulation boundary between low-voltage region and the high-voltage region and can transmit a predetermined signal from the communication microcontroller to the control microcontroller.

The electric compressor control device according to the present invention is specifically suitable for an electric compressor used in an air conditioning system for vehicles. For example, in the air conditioning system for vehicles, though a low voltage around 12V is used for general control devices while a high voltage around 200V is used for an electric compressor which is used in a refrigeration circuit, the potential difference can be absorbed by employing the control device configuration according to the present invention without problems, despite of the great potential difference.

Effect According to the Invention

In the electric compressor control device according to the present invention, an existing insulation element can be used for an insulation boundary part between low-voltage region and the high-voltage region, the low-speed communication between the communication microcontroller which receives a signal from the high-speed communication bus and the control microcontroller can be ensured stably, and predetermined power source voltage can be surely supplied into both of the communication microcontroller and the control microcontroller, so that stable operation can be ensured and the communication reliability as a whole control device can be greatly improved.

EXPLANATION OF SYMBOLS

Figure 1:
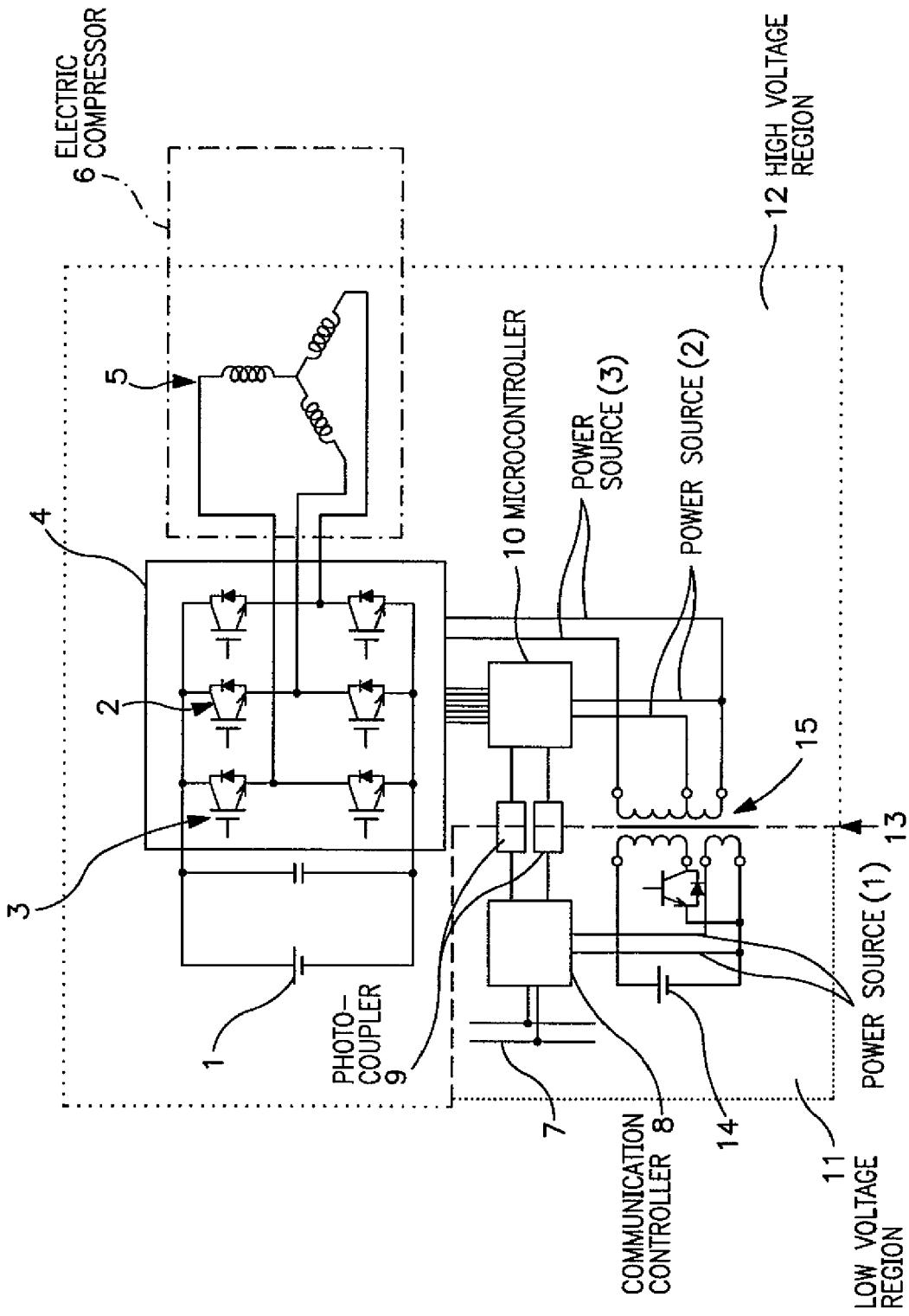
FIG. 1 is a schematic circuit diagram of the electric compressor control device according to an embodiment of the present invention.
Figure 2:
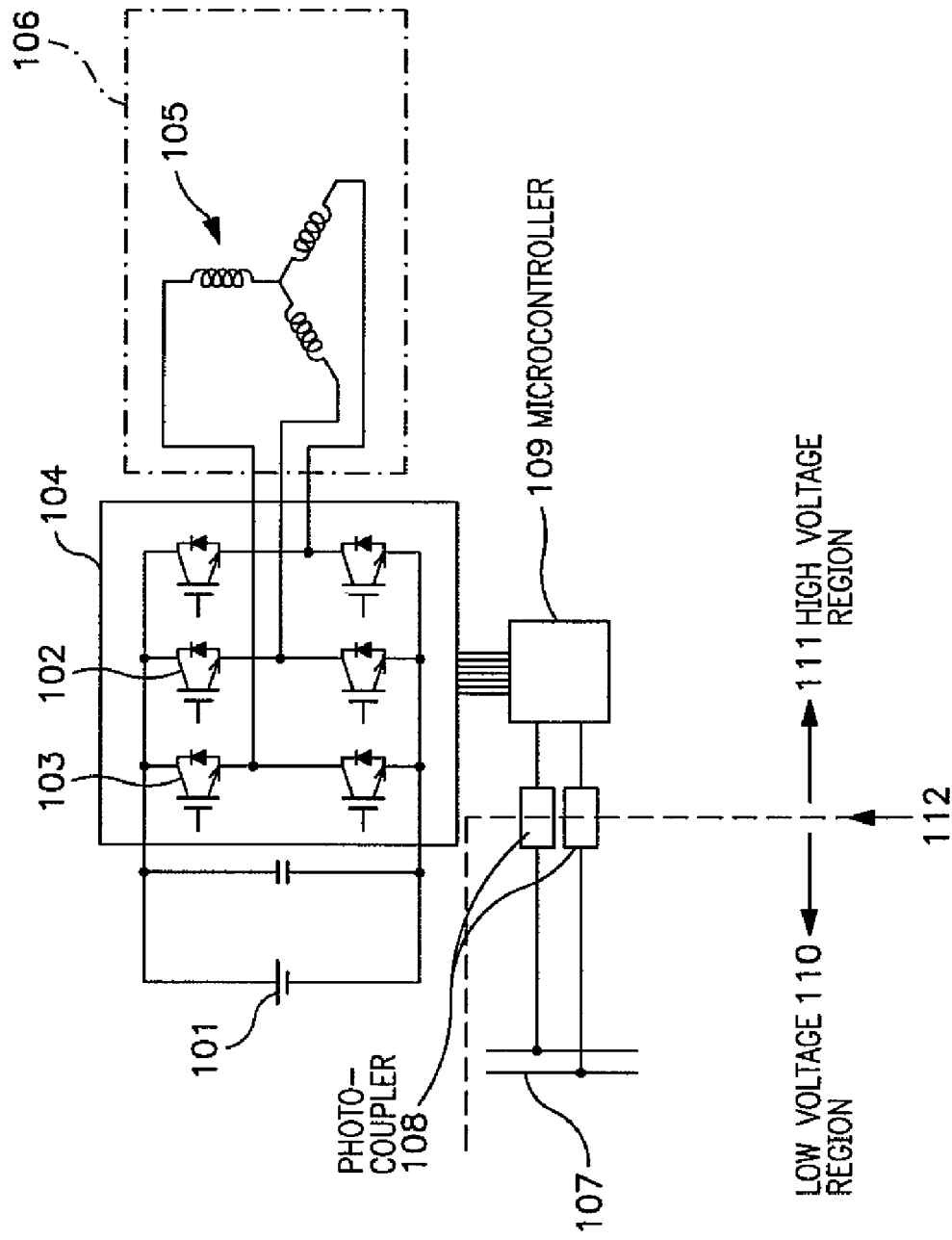
FIG. 2 is a schematic circuit diagram of a conventional electric compressor control device.

1: high-voltage power source
2: switching element
3: gate driving circuit
4: inverter
5: motor
6: electric compressor
7: communication bus
8: communication microcontroller
9: photo-coupler as insulation element
10: control microcontroller
11: low-voltage region
12: high-voltage region
13: insulation boundary
14: low-voltage power source
15: transformer

THE BEST MODE FOR CARRYING OUT THE INVENTION

Hereinafter, desirable embodiments will be explained referring to figures.

FIG. 1 shows an electric compressor control device according to an embodiment of the present invention, and specifically shows an example of a control device for an electric compressor which is provided in a refrigeration cycle of an air conditioning system for vehicles. In FIG. 1, symbol 1 implies a high-voltage direct current power source, such as a high-voltage battery mounted in a vehicle. A direct current supplied from high-voltage power source 1 is converted by inverter 4 having multiple switching elements 2 and gate driving circuit 3 into a pseudo alternating current, such as 3 phase alternating current in this embodiment, and the alternating current is supplied into motor 5 so that electric compressor 6 with built-in motor 5 is driven. Electric compressor 6 includes a compressor having only motor 5 as a drive source as well as a hybrid type compressor having inside the compressor a first compression mechanism driven by a built-in motor and a second compression mechanism driven by an external drive source other than the built-in motor.

Symbol 7 implies a communication bus which can perform a high-speed communication. An instruction signal from an upper control unit, such as ECU (Electric or Electronic Control Unit mounted in a vehicle: not shown), is transmitted via communication bus 7 to communication microcontroller 8. The instruction signal from communication microcontroller 8 is transmitted to control microcontroller 10 via photo-coupler 9 as an insulation element, and gate driving circuit 3 of each switching element 2 is controlled by an instruction signal from control microcontroller 10, so that an alternating current voltage supplied into motor 5 is controlled. Communication bus 7, communication microcontroller 8 and photo-coupler 9 are located in low-voltage region 11 such as 12V region. Because the motor is required to be driven with a high-voltage, photo-coupler 9, control microcontroller 10, inverter 4 and motor 5 are located in high-voltage region such as 200V region. The boundary of both voltage regions 11, 12 is formed as insulation boundary 13, and photo-coupler 9 is located in the part of insulation boundary 13. Photo-coupler 9 is an existing insulation element which can be generally obtained in a market and which can perform a stable low-speed communication.

Symbol 14 implies a low-voltage power source such as a low-voltage battery mounted in a vehicle, and symbol 15 implies a transformer which can function as a part of insulation boundary 13. The predetermined voltage (1) from low-voltage power source 14 is supplied from the primary side of transformer 15 to communication microcontroller 8 as a power source voltage for communication microcontroller 8. Further, at the secondary side of transformer 15 (side of high-voltage region 12) the predetermined voltage (2) transformed by transformer 15 is supplied to control microcontroller 10 as a power source voltage for control microcontroller 10. At the same time, in this embodiment the predetermined voltage (3) transformed by transformer 15 is supplied to inverter 4 as a voltage for driving the gate of inverter 4.

In thus constructed electric compressor control device, a signal from high-speed communication bus 7 is received by communication microcontroller 8 as it is, so that a high-speed communication from an upper control unit can be performed. The signal transmission from communication microcontroller 8 to control microcontroller 10 is performed through photo-coupler 9 as an insulation element located in insulation boundary 13 between low-voltage region 11 and high-voltage region 12, and though at present there is no photo-coupler suitable for high-speed communication a stable low-speed communication from communication microcontroller 8 to control microcontroller 10 can be performed by photo-coupler 9 which can be obtained at present so that the communication reliability therebetween can be surely ensured. Therefore, even a transmission of the instruction signal from control microcontroller 10 to inverter 4 can be stably performed so that a desirable inverter control is stably performed with a high accuracy.

And because the power source voltage of communication microcontroller 8 is stably supplied from low-voltage power source 14 without a disturbance, communication microcontroller 8 can be stably operated with a predetermined power source voltage. A predetermined voltage transformed through transformer 15 from low-voltage power source 14 is supplied as a power source voltage for control microcontroller 10, and transformer 15 can constitute insulation boundary 13 between low-voltage region 11 and high-voltage region 12, so that the predetermined power source voltage is stably supplied surely also to control microcontroller 10. Therefore, because both communication microcontroller 8 and control microcontroller 10 can be surely operated stably and the signal communication between communication microcontroller 8 and control microcontroller 10 can be performed stably by using existing photo-coupler 9, the communication reliability in a whole region from communication bus 7 to inverter 4 can be improved.

Furthermore, because in this embodiment a voltage from low-voltage power source 14 is transformed into the predetermined voltage (3) by transformer 15 so as to be supplied as a voltage for driving the gate of inverter 4, the gate drive control for each switching element 2 can be stably performed without a disturbance and the operation of the whole system for control of motor 5 in electric compressor 6 can be performed stably.

INDUSTRIAL APPLICATIONS OF THE INVENTION

The electric compressor control device according to the present invention can be applied as a control device for any electric compressor which is controlled by a signal from a communication bus, and specifically, is suitable as a control unit for an electric compressor used in an air conditioning system for vehicles.

The invention claimed is:

1. An electric compressor control device comprising:
   an inverter which transforms a direct current supplied from a high-voltage power source into a pseudo alternative current to be supplied as a drive current for an electric compressor motor;
   a communication microcontroller which is arranged in a low-voltage region and to which an instruction signal is transmitted via a high-speed communication bus; and
   a control microcontroller which is arranged in a high-voltage region and connected to said communication microcontroller via an insulation element for transmitting said instruction signal from said communication microcontroller as an inverter control signal to said inverter,
   wherein a power voltage for said communication microcontroller is supplied from a low-voltage power source, and a voltage from said low-voltage power source is transformed via a transformer and supplied as a power voltage for said control microcontroller.

2. The electric compressor control device according to claim 1, wherein a voltage for driving a gate of said inverter is supplied also after a voltage from said low-voltage power source is transformed via said transformer.

3. The electric compressor control device according to claim 1, wherein said insulation element is a photo-coupler.

4. The electric compressor control device according to claim 1, wherein said control device is used in an air conditioning system for vehicles.

\* \* \* \* \*